(12) United States Patent
Byun et al.

(10) Patent No.: US 7,286,829 B2
(45) Date of Patent: Oct. 23, 2007

(54) BASE STATION SELECTING METHOD IN WIRELESS NETWORK

(75) Inventors: Jae-Ho Byun, Daejeon (KR); Hyun-Mi Baek, Daejeon (KR); Sung-Lyong Kang, Kyungki-do (KR)

(73) Assignees: Electronics and Telecommunications Research Institute (KR); KT Corporation (KR)

( * ) Notice: Subject to any disclaimer, the term of this patent is extended or adjusted under 35 U.S.C. 154(b) by 168 days.

(21) Appl. No.: 10/991,719

(22) Filed: Nov. 17, 2004

(65) Prior Publication Data
US 2006/0003774 A1   Jan. 5, 2006

(30) Foreign Application Priority Data
Jul. 5, 2004   (KR) .................. 10-2004-0051944

(51) Int. Cl.
*H04Q 7/20*   (2006.01)
(52) U.S. Cl. .................. 455/446; 455/453; 455/67.14; 455/456.1
(58) Field of Classification Search ................ 455/453, 455/446, 67.14, 67.11, 456.1, 450, 440, 425, 455/456.3, 524; 342/386, 449
See application file for complete search history.

(56) References Cited

U.S. PATENT DOCUMENTS

| | | | |
|---|---|---|---|
| 5,450,615 A * | 9/1995 | Fortune et al. .......... | 455/67.16 |
| 5,613,217 A * | 3/1997 | Hagstrom et al. ....... | 455/67.11 |
| 5,787,350 A * | 7/1998 | van der Vorm et al. .... | 455/446 |
| 6,085,095 A * | 7/2000 | Collmann ................. | 455/453 |
| 6,128,501 A * | 10/2000 | Ffoulkes-Jones ......... | 455/456.3 |
| 6,167,272 A * | 12/2000 | Hellstern ................. | 455/446 |
| 6,397,063 B1 * | 5/2002 | Sessions et al. ............ | 455/425 |
| 6,466,560 B1 * | 10/2002 | Lee et al. .................. | 455/446 |
| 2003/0153315 A1 * | 8/2003 | Gunreben et al. .......... | 455/445 |
| 2003/0224790 A1 * | 12/2003 | Choi ....................... | 455/435.3 |
| 2004/0214577 A1 * | 10/2004 | Borst et al. ................ | 455/446 |

FOREIGN PATENT DOCUMENTS

KR   2000-007448   2/2000

OTHER PUBLICATIONS

"Network Elements Demand Estimating Model for Mobile LRIC," by Jae-Ho Byun, et al.; pp. 579-584; *Advanced Communication Technology*, Feb. 9, 2004; vol. 2.

* cited by examiner

*Primary Examiner*—Joseph Feild
*Assistant Examiner*—Huy D Nguyen
(74) *Attorney, Agent, or Firm*—Blakely Sokoloff Taylor & Zafman (57) ABSTRACT

In a wireless network base station design method for selecting an optimal base station in a wireless network design system, a sample point and a candidate base station area are determined according to a predetermined reference; propagation between the sample point and the candidate base station area is analyzed and a path loss is forecast; a base station is selected in consideration of wave propagation caused by the propagation analysis; a cell shrinkage degree is determined in consideration of traffic, and propagation is re-analyzed based on the cell shrinkage degree; and a base station is selected in consideration of the wave propagation and a call volume according to the re-analysis of propagation.

11 Claims, 7 Drawing Sheets

|  |  | Candidate base station areas | | | | | | | | | |
|---|---|---|---|---|---|---|---|---|---|---|---|
|  |  | 1(5) | 2(3) | 3(4) | 4(4) | 5(3) | 6(4) | 7(3) | 8(2) | 9(1) | 10(3) |
| Sample points | 1 | 1 | 0 | 0 | 1 | 1 | 0 | 0 | 0 | 1 | 0 |
| | 2 | 0 | 0 | 1 | 0 | 1 | 0 | 0 | 0 | 0 | 1 |
| | 3 | 1 | 1 | 1 | 1 | 0 | 0 | 0 | 0 | 0 | 0 |
| | 4 | 0 | 0 | 0 | 1 | 0 | 1 | 0 | 0 | 0 | 1 |
| | 5 | 1 | 1 | 1 | 0 | 0 | 0 | 1 | 0 | 0 | 1 |
| | 6 | 1 | 0 | 0 | 0 | 0 | 1 | 0 | 0 | 0 | 0 |
| | 7 | 0 | 0 | 1 | 0 | 0 | 1 | 1 | 0 | 0 | 0 |
| | 8 | 0 | 0 | 0 | 1 | 0 | 0 | 0 | 1 | 0 | 0 |
| | 9 | 1 | 1 | 0 | 0 | 1 | 1 | 1 | 0 | 0 | 0 |
| | 10 | 0 | 0 | 0 | 0 | 0 | 0 | 0 | 1 | 0 | 0 |

|  |  | Candidate base station areas | | | | | | | | |
|---|---|---|---|---|---|---|---|---|---|---|
|  |  | 1(5) | 2(3) | 3(4) | 4(4→3) | 5(3) | 6(4) | 7(3) | 8(2)* | 10(3) |
| Sample points | 1 | 1 | 0 | 0 | 1 | 1 | 0 | 0 | 0 | 0 |
| | 2 | 0 | 0 | 1 | 0 | 1 | 0 | 0 | 0 | 1 |
| | 3 | 1 | 1 | 1 | 1 | 0 | 0 | 0 | 0 | 0 |
| | 4 | 0 | 0 | 0 | 1 | 0 | 1 | 0 | 0 | 1 |
| | 5 | 1 | 1 | 1 | 0 | 0 | 0 | 1 | 0 | 1 |
| | 6 | 1 | 0 | 0 | 0 | 0 | 1 | 0 | 0 | 0 |
| | 7 | 0 | 0 | 1 | 0 | 0 | 1 | 1 | 0 | 0 |
| | 8 | 0 | 0 | 0 | 1→0 | 0 | 0 | 0 | 1 | 0 |
| | 9 | 1 | 1 | 0 | 0 | 1 | 1 | 1 | 0 | 0 |
| | 10 | 0 | 0 | 0 | 0 | 0 | 0 | 0 | 1 | 0 |

FIG.3B

| | | Candidate base station areas | | | | | | | | |
|---|---|---|---|---|---|---|---|---|---|---|
| | | 1(5) | 2(3) | 3(4) | 4(3) | 5(3) | 6(4) | 7(3) | 8(2)* | | 10(3) |
| Sample points | 1 | 1 | 0 | 0 | 1 | 1 | 0 | 0 | 0 | | 0 |
| | 2 | 0 | 0 | 1 | 0 | 1 | 0 | 0 | 0 | | 1 |
| | 3 | 1 | 1 | 1 | 1 | 0 | 0 | 0 | 0 | | 0 |
| | 4 | 0 | 0 | 0 | 1 | 0 | 1 | 0 | 0 | | 1 |
| | 5 | 1 | 1 | 1 | 0 | 0 | 0 | 1 | 0 | | 1 |
| | 6 | 1 | 0 | 0 | 0 | 0 | 1 | 0 | 0 | | 0 |
| | 7 | 0 | 0 | 1 | 0 | 0 | 1 | 1 | 0 | | 0 |
| | 8 | 0 | 0 | 0 | 0 | 0 | 0 | 0 | 1 | | 0 |
| | 9 | 1 | 1 | 0 | 0 | 1 | 1 | 1 | 0 | | 0 |
| | 10 | 0 | 0 | 0 | 0 | 0 | 0 | 0 | 1 | | 0 |

| | | Candidate base station areas | | | | | | |
|---|---|---|---|---|---|---|---|---|
| | | 1(3)* | | 3(4)* | | 6(1)* | | 8(2)* | |
| Sample points | 1 | 1 | | 0 | | 0 | | 0 | |
| | 2 | 0 | | 1 | | 0 | | 0 | |
| | 3 | 0 | | 1 | | 0 | | 0 | |
| | 4 | 0 | | 0 | | 1 | | 0 | |
| | 5 | 0 | | 1 | | 0 | | 0 | |
| | 6 | 1 | | 0 | | 0 | | 0 | |
| | 7 | 0 | | 1 | | 0 | | 0 | |
| | 8 | 0 | | 0 | | 0 | | 1 | |
| | 9 | 1 | | 0 | | 0 | | 0 | |
| | 10 | 0 | | 0 | | 0 | | 1 | |

BASE STATION SELECTING METHOD IN WIRELESS NETWORK

CROSS REFERENCE TO RELATED APPLICATION

This application claims priority to and the benefit of Korea Patent Application No. 10-2004-51944 filed on Jul. 5, 2004 in the Korean Intellectual Property Office, the entire content of which is incorporated herein by reference.

BACKGROUND OF THE INVENTION (a) Field of the Invention

The present invention relates to a method for selecting a base station in a wireless network applied to the PCS system with the frequency of 1,850 MHz and the CDMA cellular system with the frequency of 800 MHz.

(b) Description of the Related Art

A wireless network design system provides a system for selecting an optimal location and a number of base stations for covering a service area through analysis of cell coverage, a call volume, and a cell capacity relation for each base station.

Conventional wireless network design techniques include a method for allowing a user to establish a location of the base station through the user's direct view and determination of the location displayed on a screen of the wireless network design system; and a method for directly establishing a base station appropriate for a target area, briefly designing a cell, analyzing propagation, and checking whether the location of the base station is suitably established.

Also, a Korean published application of No. 2000-7448 (filed on Feb. 7, 2000) discloses a method for using grids with weights and realizing an automatic base station installation program in a wireless network design system, which realizes a propagation analysis task and a base station selection task in common and which selects a base station with high cell coverage by analyzing the propagation on the uniform cell coverage.

The conventional base station selecting method degrades accuracy and efficiency since the method considers no propagation environment or call volume information.

SUMMARY OF THE INVENTION

It is an advantage of the present invention to provide a wireless network design method for finding an optimal base station location and a used amount thereof in consideration of propagation environment and call volume information.

In one aspect of the present invention, a wireless network base station design method for selecting an optimal base station in a wireless network design system comprises: (a) determining a sample point and a candidate base station area according to a predetermined reference; (b) analyzing propagation between the sample point and the candidate base station area and forecasting a path loss; (c) selecting a base station in consideration of wave propagation caused by the propagation analysis; (d) determining a cell shrinkage degree in consideration of traffic, and re-analyzing propagation based on the cell shrinkage degree; and (e) selecting a base station in consideration of the wave propagation and a call volume according to the re-analysis of propagation.

The sample point is generated on a selected service area at regular or irregular intervals in (a).

A 3-dimensional path loss is realized according to a case in which an obstruction is provided within wave propagation and a case in which no obstruction is provided within wave propagation in (b).

The step (d) comprises: (i) determining per-area cell erlang capacity; (ii) determining a per-area call volume based on a number of per-area subscribers and a number of per-subscriber erlangs; and (iii) comparing the per-area cell capacity and the per-area call volume, and determining a cell shrinkage degree based on the greater one of the two compared values, wherein the propagation is analyzed again by using not the distance of R between the sample point and the candidate base station area but a value of R/A.

The step (i) comprises: determining the cell capacity based on a sector, a blocking probability, a frequency, and a number of traffic channels; determining the radius of the cell found in (b) and (c); and determining per-area cell capacity.

The step (e) comprises: (i) measuring a propagation intensity between the candidate base station area and the sample point, and generating a base station selection matrix generated by inputting a component value according to a service available state, the matrix having the sample point and the candidate base station area as a row and a column respectively; and (ii) eliminating a component of the column which corresponds to the candidate base station area with the minimum service-available sample points from the base station selection matrix.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A general purpose of designing the base station is to minimize the number of base stations, but it is impossible to analyze propagation and traffic over the whole area. Hence, the base station design method according to the preferred embodiment allows the user: to select in advance an area to be serviced from among the service area; sample the area; generate a candidate base station area into grids; analyze the propagation and traffic between each sample point and the candidate base station area; configure a base station selecting matrix based on analysis results; and eliminate base stations with low efficiency until all the sample points are served, thereby selecting the optimized base station location.

The base station design method according to the preferred embodiment includes: determining a sample point and a candidate base station area, and forecasting a path loss between the sample point and the candidate base station area; analyzing a cell capacity and a subscriber call volume determined in consideration of various input factors, and forecasting cell shrinkage; and selecting the optimized base station location.

Figure 1:
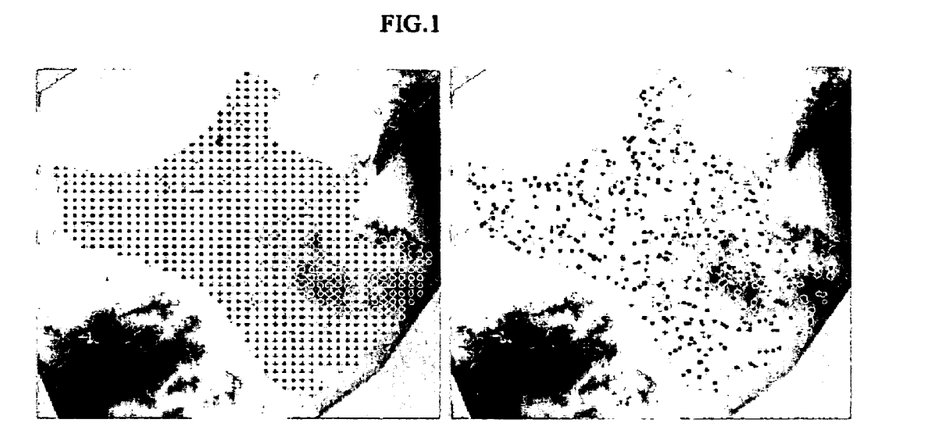
FIG. 1 shows exemplified sample points according to a preferred embodiment of the present invention.
Figure 2:
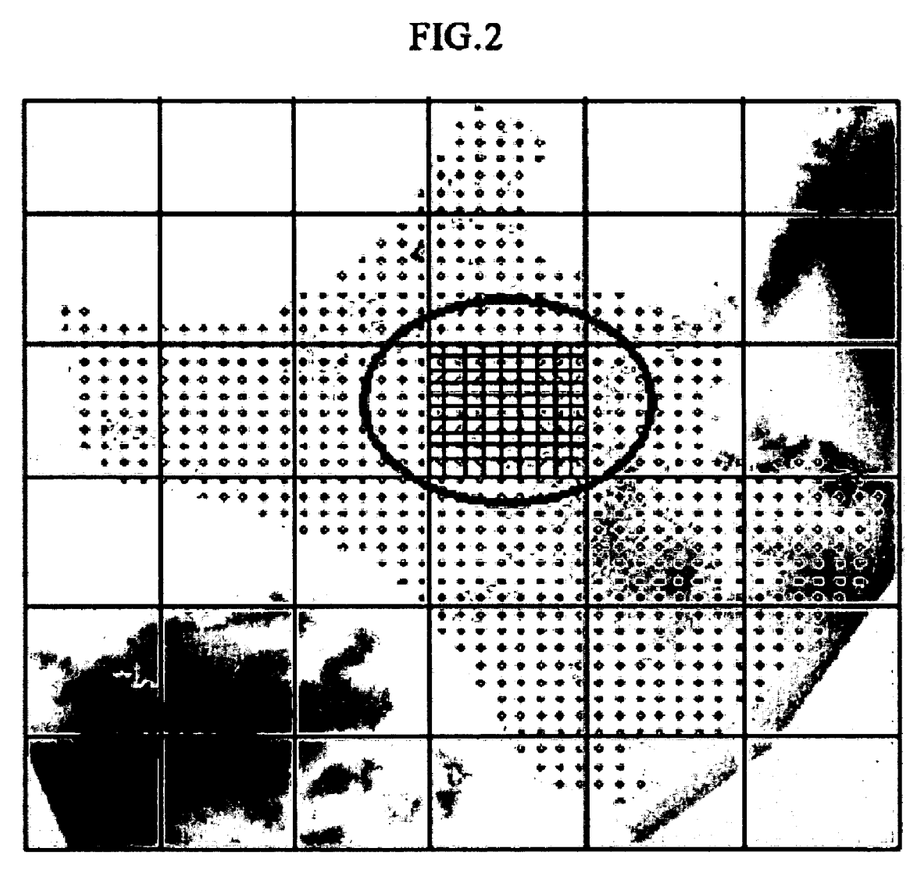
FIG. 2 shows a candidate base station area according to a preferred embodiment of the present invention.

FIG. 1 shows exemplified sample points according to a preferred embodiment of the present invention, and FIG. 2 shows a candidate base station area according to a preferred embodiment of the present invention.

It is substantially impossible to measure propagation intensity in the total service area in the wireless network design, and hence, the sample points are generated on desired areas on the map as shown in FIG. 1. In this instance, the sample points are generated at regular intervals on the area to be serviced or at irregular intervals on the area desired by a wireless network designer.

When the sample points are generated on the area, the entire area is generated into grids as shown in FIG. 2. Grid points of FIG. 2 are candidate areas at which base stations can be located.

The location of a base station is selected through subsequent stages when the sample points and the candidate area are determined.

(1) Propagation Analysis Stage (Path Loss Forecasting Stage)

Waves of a base station are reduced because of a distance, and diffraction and dispersion of obstructions while propagated to a mobile station which is far from the base station. The above-noted model for forecasting the reduction of propagation and forecasting the intensity of waves provided to the mobile station from the base station is referred to as a path loss model. A range of the area serviced by the base station is determined by determining whether to receive signals from the mobile station and measuring a wave reached range through the path loss model.

The base station design method according to the preferred embodiment of the present invention does not use a 2-dimensional path loss model which is determined by existing environments (e.g., metropolises and rural areas) and destroying obstructions, but realizes and uses a 3-dimensional propagation model which analyzes and combines path loss factors based on accurate geographical information and which is accordingly applicable to both metropolises and rural areas. In this instance, the factors affecting the path loss include wave propagation distances, frequency spectrums, obstructions provided within the propagation distance, heights of buildings or obstructions, heights of base station antennas, and heights of mobile station antennas. The intensity of waves provided to the sample point from the grid point is calculated on the assumption that a base station is built on each grid point generated to be a candidate base station area in the propagation analysis stage. The 3-dimensional propagation model is realized according to two environmental cases which include the NLOS (non line of sight: an obstruction exists within the range of wave propagation) and the LOS (line of sight: no obstruction exists within the range of wave propagation), and the path loss is forecast by using the GIS (geographical information system).

In the case of NLOS, the free space loss of waves and diffraction and dispersion losses caused by obstructions are forecast through a vertical plane model of $L_{VPM}$, a combination of the Knife edge-JRC model and the Walfisch model.

The path loss is forecast through the WIM-LOS (Walfisch Ikegami line of sight) model in the case of LOS in which a base station is provided in a metropolis, and the same is forecast by using a dual slope model in the case of LOS in which almost no obstruction is provided near the base station in a like manner of a rural area.

The Knife edge-JRC model is a combination of the Knife edge model and the dual slope model, which forecasts the loss by adding a diffraction loss caused by an obstruction to a path loss caused by wave propagation when a predetermined number of obstructions further affect the path loss than other neighboring obstructions do. The Knife edge-JRC model does not calculate the path loss which is dependent on the distance in a like manner of the Knife edge model to a free path loss, but considers the dual slope model and measures more precise propagation attenuations.

In addition, the Walfisch model is appropriate for an urban environment in which buildings with similar heights stand close together, and forecasts losses caused by diffraction and dispersion caused by the buildings with similar heights standing close together, to be major path losses.

The path loss in the case of NLOS of the 3-dimensional path loss model is given in Equation 1.

$$L_{NLOS} = (1-g)L_{KJ} + gL_W \qquad \text{Equation 1}$$

where g is a factor for combining the above-noted two models, and is a determination factor for showing a state in which what part a condition of one model from among the Knife edge-JRC model ($L_{KJ}$) and the Walfisch model ($L_W$) occupies. In detail, g is a function determined by the uniformity of heights of obstructions and the width of alleys between buildings, given in Equation 2.

$$g = g_h * g_w \qquad \text{Equation 2}$$

a. $CH = Hr/\sigma_h$ (number of buildings > 1), besides $CH = 0$

$g_h = 1$ ($CH > 3$), $g_h = 0$ ($CH < 1$), b. $g_h = \dfrac{CH - 1}{2}$ ($1 < CH < 3$)

$g_w = 1$ ($w < 50$ m), $g_w = 0$ ($w > 100$ m), c. $g_w = \dfrac{100 - w}{50}$ ($50$ m $< w < 100$ m)

where Hr is a mean height (unit: m) of buildings provided within the wave propagation, $\sigma_h$ is a standard deviation (unit: m) of heights of buildings provided within the wave propagation, and w is a mean width (unit: m) of alleys provided within the wave propagation.

As given in Equation 2, g is determined by $g_h$ and $g_w$ where $g_w$ determines an environmental factor caused by the uniformity of heights of obstructions and thus determines the combined degree of the two models. That is, the ratio of CH between the mean height and the standard deviation of the buildings (obstructions) within the wave propagation is found, and $g_h$ is established to be 1 to increase the combined part of the Walfisch model when CH is great, that is, when the difference of heights of buildings is less. Also, $g_w$ determines the combined degree of the two models by determining how closely the buildings stand together.

(2) Cell Shrinkage Model Suggestion Stage According to Traffic Analysis

Base station capacity and subscriber density capacity as well as the wave propagation are to be considered in order to determine the service area of the base station. In this case, the number of sectors of the base station built therein and the number of frequency assignments (FAs) are determined, capacity of the base station and the traffic requirement capacity by subscribers are calculated, and it is determined whether the base station accommodates the subscribers in a coverage area. Therefore, a traffic-considered cell coverage determination model for determining the traffic-considered cell coverage is proposed in the cell shrinkage model suggestion stage according to traffic analysis.

However, an area where no service is available is generated when the cell capacity fails to satisfy the required call volume even though the wave propagation is determined to be the cell coverage. Therefore, in order to design the wireless network, it is needed to analyze the propagation and comparatively analyze the cell capacity and the call volume per area so that the cell may be shrunk by propagation analysis until the cell capacity satisfies the call volume.

The base station capacity, that is, the cell capacity, is determined in order to suggest the cell shrinkage model. That is, the erlang capacity per cell is determined based on program input factors including sectors, blocking probability (outage probability), frequencies, and the number of traffic channels.

The radius of the cell is determined according to the wave propagation found in the propagation analysis and base station selection stage.

The total cell capacity (=B×number of FAs) per base station area of 1 km² is determined, and the call volume per area is determined based on the number of subscribers per area and the number of erlangs per subscriber. The B represents designed erlang capacity per area on one FA basis, the 1.23 MHz-frequency band FA is used per channel in the CDMA system, and the number of FAs per base station may be increased within the given frequency band.

The cell capacity per area and the call volume per area are compared, the greater value therebetween is substituted for K of $A=[(B \times FA)/K]^{0.5}$ to find the value of A which is a shrunk volume of the cell, and the propagation is again analyzed by using not R but R/A as the distance between the sample point and the candidate base station area.

Through the above-described process, the value of A is established to be less than 1 so that the distance which is an input value in the case of propagation analysis may be increased by the value of A, when the cell capacity is less than the call volume. Accordingly, the cell is shrunk to accommodate the call volume as the value of A is varied as described above.

(3) Base Station Selecting Stage

In this stage, an area to be serviced is selected in advance from among service areas, and is then sampled, the candidate base station area is generated into grids, and the above-noted path loss model and the traffic-considered cell coverage determination model are used to form a base station selection matrix. Hence, the candidate base station area is efficiently selected through the matrix to thus cover the propagation area with a minimum number of base stations.

Figure 3A:
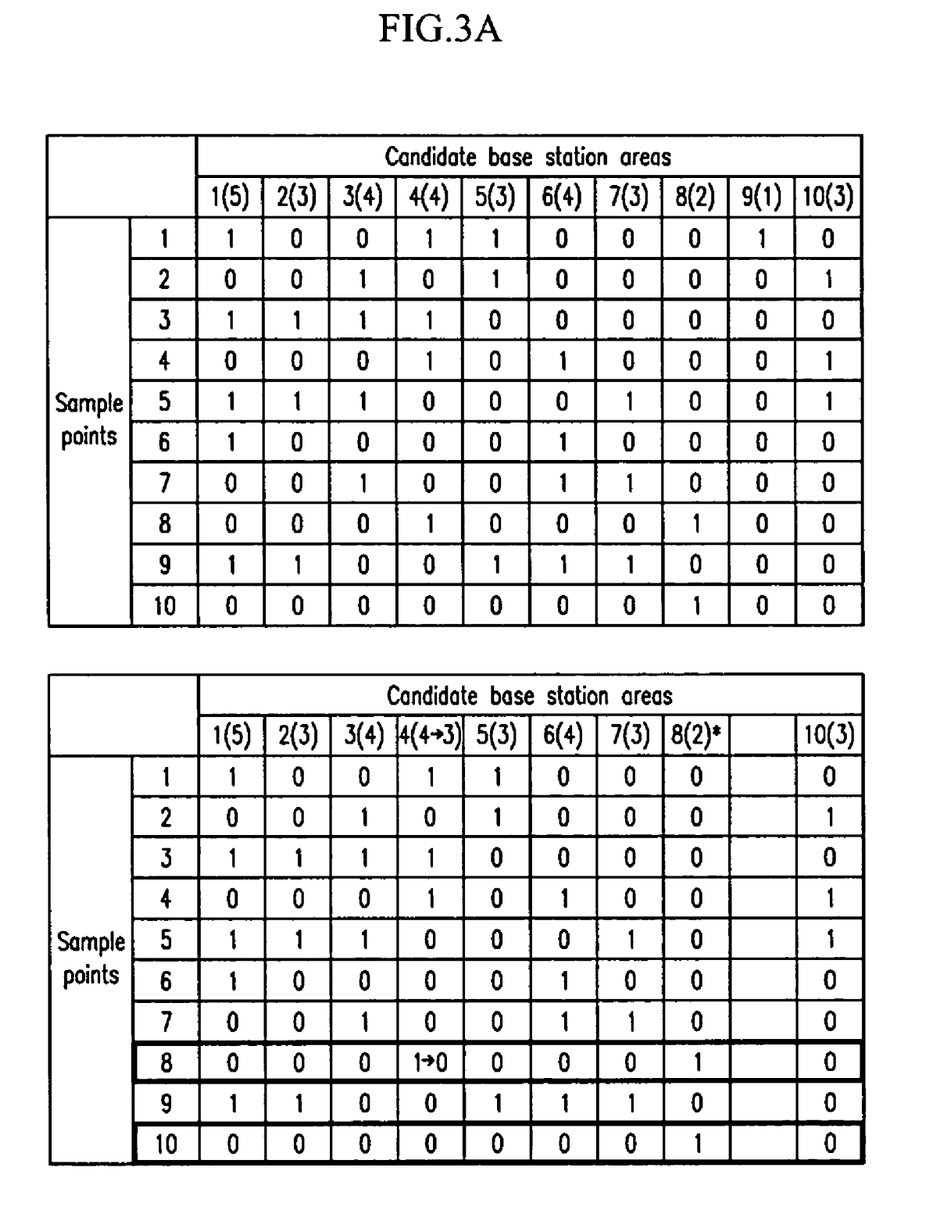
FIGS. 3A and 3B show exemplified algorithm matrices for selecting base stations according to a preferred embodiment of the present invention.
Figure 3B:
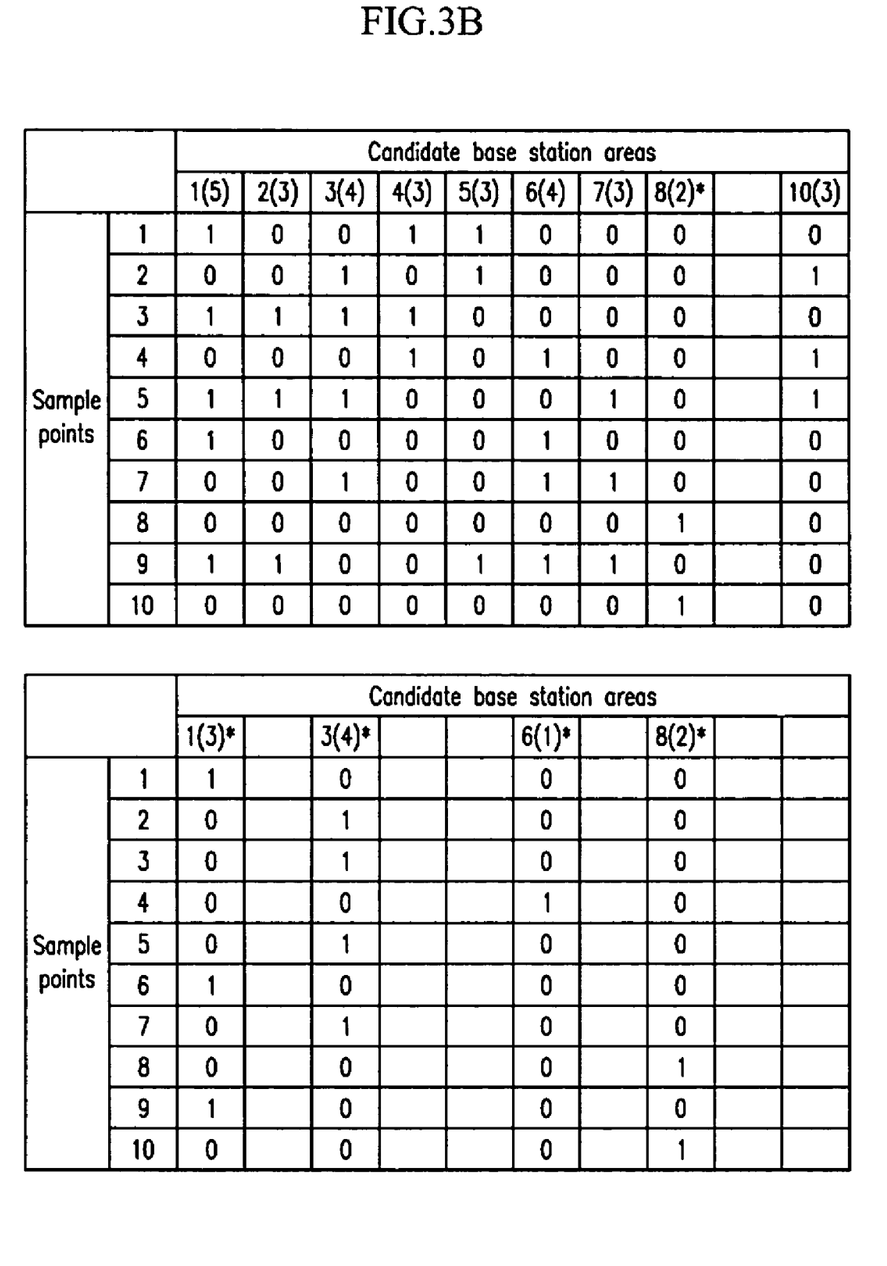

FIGS. 3A and 3B show exemplified algorithm matrices for selecting base stations according to a preferred embodiment of the present invention.

As shown, when the base station selection matrix is configured based on the results analyzed in the 3-dimensional propagation analysis stage, the value of 1 is input when the candidate base station area supports the sample point more than a reference propagation value, and the value of 0 is input when the candidate base station area supports the sample point less than the reference propagation value, and hence, the matrix is generated between the candidate base station area and the sample point.

That is, a service matrix is given below in consideration of b-numbered candidate base station areas and s-numbered sample points.

$M(i, j) = 1$ when the base station supports the sample point, and $= 0$ when the base station does not support the sample point where i and j represent an index (i=1,2, ... ,b) of the candidate base station area and an index (j=1,2, ... ,s) of the sample point, respectively. Also, the number of sample points supported by the candidate base station area is given to be $$S(i) = \sum_{j=1}^{s} M(i, j).$$

Figure 4:
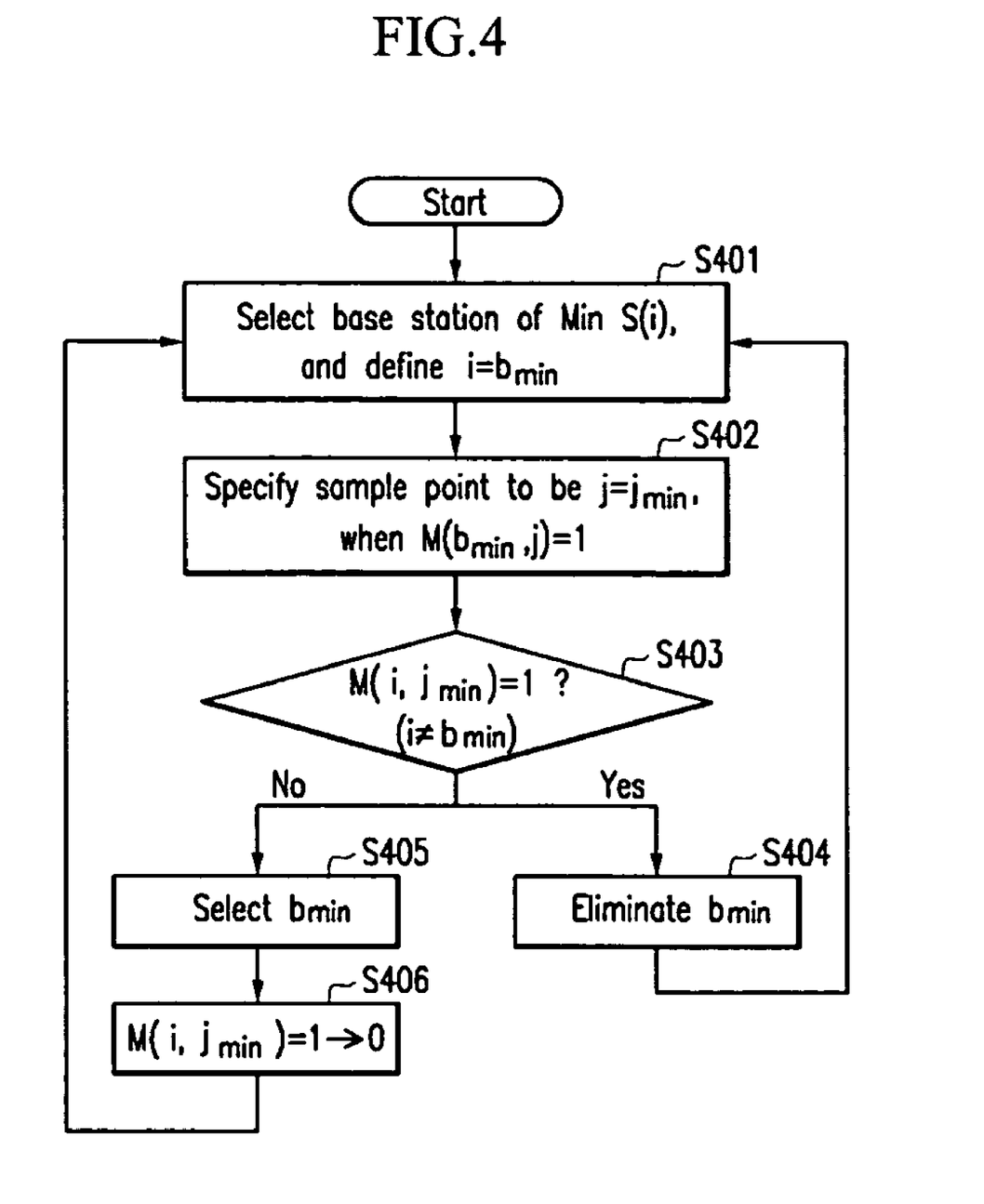
FIG. 4 shows a flowchart of a base station selecting method in a wireless network base station design method according to a preferred embodiment of the present invention.

FIG. 4 shows a base station selecting process according to a preferred embodiment of the present invention.

As shown, a candidate base station area with the minimum number of sample points Min S(i) is selected and the index i in this case is defined to be $b_{min}$ in step S401. A selected column which is the index j of the sample points supported by $b_{min}$ is specified to be $j_{min}$ in step S402 where $j_{min}$ may be plural.

It is determined whether other base stations can support $j_{min}$. In detail, it is checked whether the case of $M(i,j_{min})=1$ is provided in the candidate base station areas except the case of $i=b_{min}$ in step S403.

When a plurality of component values of 1 is found from among the row components including the component value of 1 included in the $j_{min}$ column, it is considered to be a case in which other base stations support $j_{min}$ at least once, and the current $b_{min}$ is eliminated in step S404.

When one component having the component value of 1 is found from the row components including the component value of 1 included in the $j_{min}$ column according to the checking result of the previous step S403, it is considered to be the case in which other base stations do not support at least one $j_{min}$, and the candidate base station area included in the $j_{min}$ column is selected to be the optimal base station, and the component value of $M(i,j_{min})=1$ of the base station supporting $j_{min}$ is converted to $M(i,j_{min})=0$ in steps S405 and S406, thereby increasing calculation rates and allowing more efficient base station selection.

The above-described steps are iterated until the sample points are supported by the base station.

Figure 5:
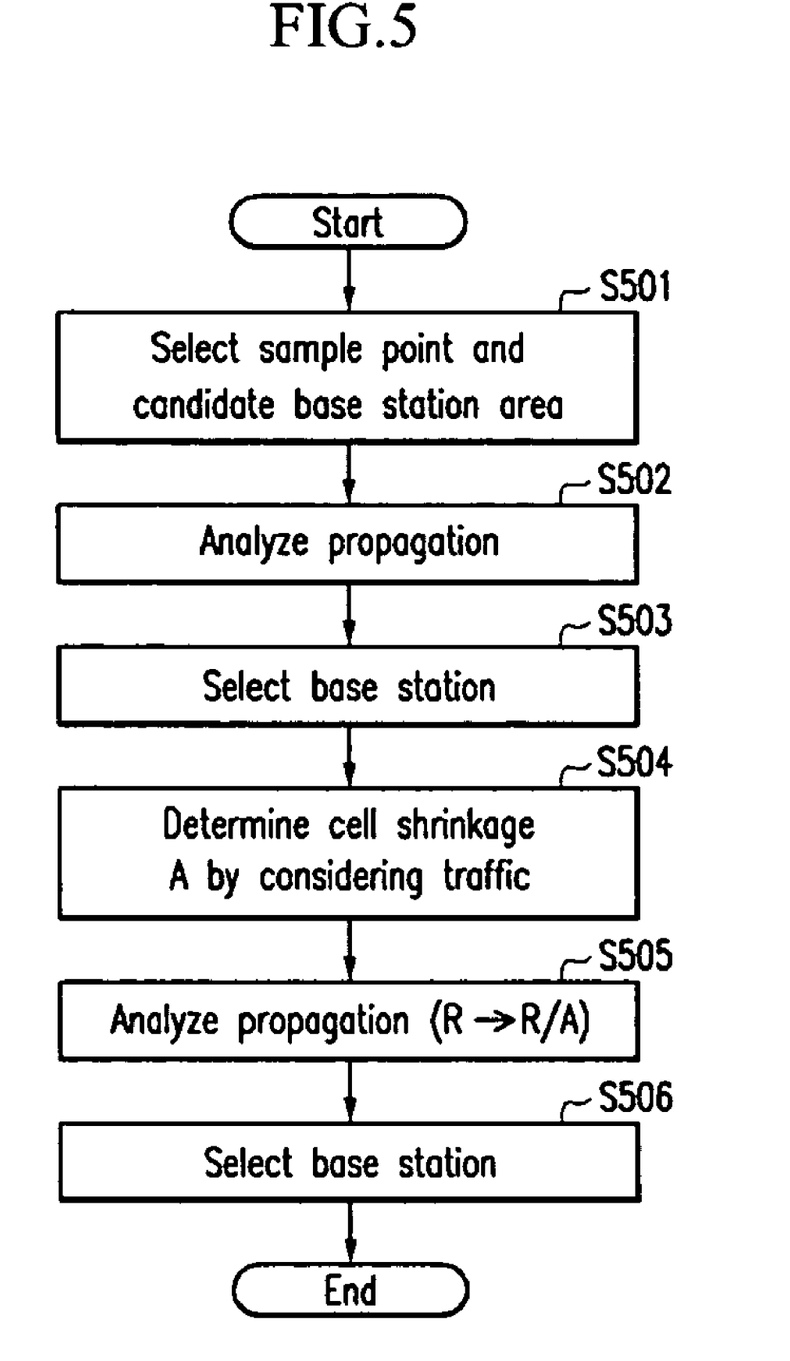
FIG. 5 shows a flowchart of a wireless network base station design method according to a preferred embodiment of the present invention.

FIG. 5 shows a flowchart of a wireless network base station design method according to a preferred embodiment of the present invention.

As shown, a sample point and a candidate base station area are selected in step S501, and a propagation analysis is performed through the 3-dimensional propagation model according to the preferred embodiment of the present invention to thus select a base station in consideration of wave propagation in steps S502 and S503.

A cell shrunk degree of A in consideration of traffic is determined in step S504, the propagation analysis is performed again using not R but R/A for the distance between the sample point and the candidate base station area in step S505, and the optimal base station is selected in consideration of wave propagation and the call volume through the process of FIG. 4 in step S506.

Figure 6:
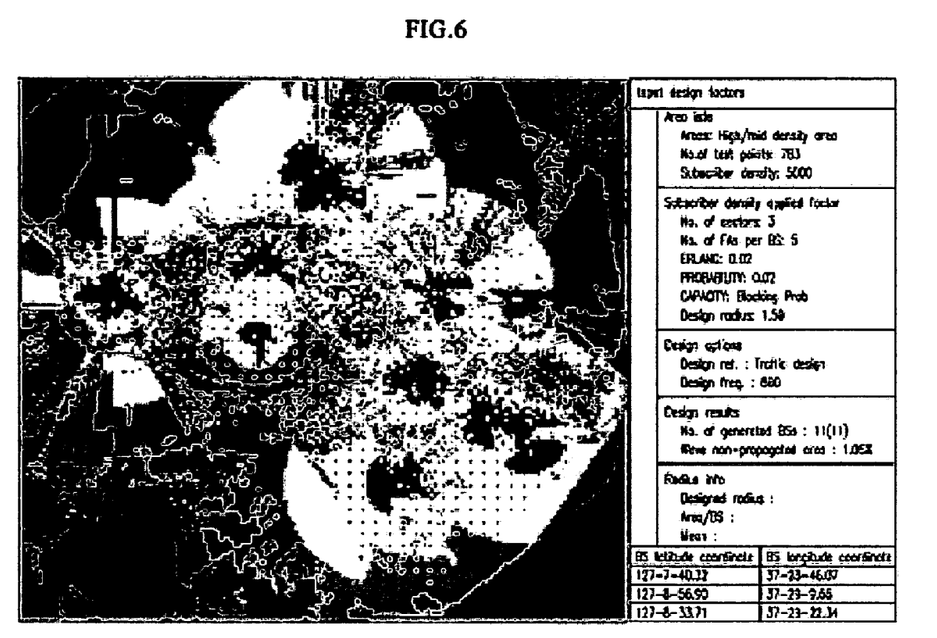
FIG. 6 shows exemplified outputs by a program which uses a wireless network base station design method according to a preferred embodiment of the present invention.

FIG. 6 shows simulation results generated by the base station design method according to a preferred embodiment of the present invention.

As shown, the optimal base station location and areas where no wave is propagated are depicted to be red zones and are displayed on the screen according to the simulation.

Therefore, the optimal candidate base station area and the number of base stations are induced by eliminating in advance the base stations with low efficiency until the sample points are serviced on the assumption that the base stations are built in the candidate area. Also, when the sample point supportable by the selected base station is supported by another candidate base station area, the base station is more effectively selected by considering the sample point to be not supported.

The wireless network base station design method according to the preferred embodiment of the present invention is realized into programs and stored on computer-readable recording media including CD-ROMs, RAMs, ROMs, floppy disks, HDDs, and optical discs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Hence, the base station design method according to the preferred embodiment plays an important role for accurate and fast wireless network design and enables efficient infrastructure investment.

Further, optimal locations of mobile network base stations required for specific areas are provided by desired input values, and the preferred embodiment is applicable to effective selection of numbers of FAs of base stations and sectors depending on regional features.

What is claimed is:

1. A wireless network base station design method for selecting an optimal base station in a wireless network design system, comprising:
   (a) determining a sample point and a candidate base station area according to a predetermined reference;
   (b) analyzing wave propagation between the sample point and the candidate base station area and forecasting a path loss;
   (c) repeating the (a) step and the (b) step, and then selecting base stations among the candidate base stations based on the wave propagation analysis obtained by the repetition of the (a) step and (b) step;
   (d) determining a cell shrinkage degree in consideration of traffic and a cell coverage obtained on the basis of the selected base stations, and re-analyzing the wave propagation based on the cell shrinkage degree, wherein the cell shrinkage degree indicates a reduction in the cell coverage in consideration of the traffic and cell erlang capacity; and
   (e) selecting at least one base station required on a serve network area according to the re-analysis of the wave propagation.

2. The wireless network base station design method of claim 1, wherein the sample point is one of a plurality of sample points generated on a selected service area at regular or irregular intervals in (a).

3. The wireless network base station design method of claim 1, wherein a 3-dimensional path loss is realized according to a case in which the wave propagation is obstructed and a case in which the wave propagation is not obstructed in (b).

4. The wireless network base station design method of claim 1, wherein (d) comprises:
   (i) determining per-area cell erlang capacity;
   (ii) determining a per-area call volume based on a number of per-area subscribers and a number of per-subscriber erlangs; and
   (iii) comparing the per-area cell capacity and the per-area call volume, and determining the cell shrinkage degree based on the greater one of the two compared values, wherein the wave propagation is analyzed again by using not the distance of R between the sample point and the candidate base station area but a value of R/A, where A is the cell shrinkage degree.

5. The wireless network base station design method of claim 4, wherein the cell shrinkage degree is found by $A=[(B \times FA)/K]^{0.5}$ where B is designed erlang capacity for each area of 1 km$^2$ on one frequency assignment (FA) basis, and K is a greater one of the per-area cell capacity and the per-area call volume.

6. The wireless network base station design method of claim 4, wherein (i) comprises:
   determining the cell capacity based on a sector, a blocking probability, a frequency, and a number of traffic channels;
   determining the radius of the cell on the basis of the cell coverage obtained in (c); and
   determining per-area cell capacity.

7. The wireless network base station design method of claim 1, wherein (e) comprises:
   (i) measuring a propagation intensity between the candidate base station area and the sample point, and generating a base station selection matrix generated by inputting a component value according to a service available state, the matrix having the sample point and the candidate base station area as a row and a column respectively; and
   (ii) eliminating a component of the column which corresponds to the candidate base station area with minimum service-available sample points from the base station selection matrix.

8. The wireless network base station design method of claim 7, wherein (i) comprises:
   inputting 1 as the component value when the candidate base station services the sample point more than a reference propagation threshold value, and inputting 0 as the component value when the candidate base station does not service the sample point more than a reference propagation threshold value, and (ii) comprises:
   selecting a column with the minimum number of the component value of 1;

eliminating the candidate base station area included in the selected column when a plurality of components having the component value of 1 is provided in the row components including the component value of 1 included in the selected column; and selecting the candidate base station area included in the selected column to be the optimal base station, and converting the component value of 1 of other columns of the row having the component value of 1 from among the components included in the selected column into 0 when a component having the component value of 1 is provided in the row components including the component value of 1 included in the selected column.

9. The wireless network base station design method of claim 8, wherein the step of (ii) is repeated until the service-available sample points are supported by the base station.

10. The wireless network base station design method of claim 7, wherein the step of (ii) is repeated until the service-available sample points are supported by the base station.

11. A computer-readable medium storing a computer-executable program executable to select an optimal base station in a wireless network design system, the program when executed causes a machine to:

(a) determine a sample point and a candidate base station area according to a predetermined reference;

(b) analyze wave propagation between the sample point and the candidate base station area and forecasting a path loss;

(c) repeat the (a) step and the (b) step, and then select base stations based on the wave propagation analysis obtained by the repetition of the (a) step and (b) step;

(d) determine a cell shrinkage degree in consideration of traffic and a cell coverage obtained on the basis of the selected base stations, and re-analyzing the wave propagation based on the cell shrinkage degree, wherein the cell shrinkage degree indicates a reduction in the cell coverage in consideration of the traffic and cell erlang capacity; and (e) select at least one base station required on a serve network area according to the re-analysis of the wave propagation.

* * * * *